(12) United States Patent
Benveniste et al.

(10) Patent No.: US 6,349,372 B1
(45) Date of Patent: Feb. 19, 2002

(54) VIRTUAL UNCOMPRESSED CACHE FOR COMPRESSED MAIN MEMORY

(75) Inventors: Caroline D. Benveniste, New York; Peter A. Franaszek, Mt. Kisco; John T. Robinson, Yorktown Heights, all of NY (US); Charles O. Schulz, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,069

(22) Filed: May 19, 1999

(51) Int. Cl.[7] ............................................. G06F 12/00
(52) U.S. Cl. ................... 711/159; 711/205; 711/207; 711/118; 711/160; 707/101; 709/247; 710/68
(58) Field of Search .............................. 711/159, 160, 711/205–209, 170, 118; 707/101; 709/247; 710/68

(56) References Cited

U.S. PATENT DOCUMENTS 6,173,381 B1    1/2001  Dye ........................... 711/170
6,208,273 B1 *  3/2001  Dye et al. ..................... 341/51

\* cited by examiner

Primary Examiner—Matthew Kim
Assistant Examiner—Pierre M. Vital
(74) Attorney, Agent, or Firm—Scully, Scott, Murphy & Presser; Robert P. Tassinari, Esq.

(57) ABSTRACT

System and method for reducing data access latency for cache miss operations in a computer system implementing main memory compression in which the unit of compression is a memory segment. The method includes steps of providing common memory area in main memory for storing compressed and uncompressed data segments; accessing directory structure formed in the main memory having entries for locating both uncompressed data segments and compressed data segments for cache miss operations, each directory entry including index for locating data segments in the main memory and further indicating status of the data segment; and, checking a status indication of a data segment to be accessed for a cache miss operation, and processing either a compressed or uncompressed data segment from the common memory area according to the status.

19 Claims, 5 Drawing Sheets

VIRTUAL UNCOMPRESSED CACHE FOR COMPRESSED MAIN MEMORY

BACKGROUND OF THE INVENTION

1. Field of the Invention

The present invention relates to computer systems implementing main memory compression and, particularly to a virtual uncompressed cache for reducing latency which may be incurred due to the delays associated with decompressing each line (or set of lines) in compressed main memory systems.

2. Discussion of the Prior Art

In computer systems with relatively large amounts of main memory, the memory cost can be a significant fraction of the total system cost. This has led to the consideration of computer system architectures in which the contents of main memory are maintained in a compressed form. One approach to the design of such an architecture is to compress memory using cache lines, or sets of cache lines, as the unit of compression: cache lines are maintained in an uncompressed form in the cache; compressed before storage from the cache to main memory; and decompressed on cache misses which result in reads from main memory. A number of problems must be solved in order to make such an approach effective. For example, cache lines stored in main memory without compression are of a uniform fixed size; however, using memory compression, they now occupy varying amounts of space. A number of techniques for efficiently storing and accessing variable size cache lines in main memory are now known, for example, as described in commonly-owned, U.S. Pat. No. 5,761,536 to P. Franaszek entitled System and Method for Reducing Memory Fragmentation by Assigning Remainders to Share Memory Blocks on a Best Fit Basis; and, as described in commonly-owned, U.S. Pat. No. 5,864,859, to P. Franaszek entitled System and Method of Compression and Decompression using Store Addressing.

Another problem is that of additional memory access latency which may be attributed to two sources as compared to systems that do not use compression: First, since compressed lines occupy varying amounts of space, the space used to store compressed lines must be allocated dynamically, and the location of compressed lines found using a directory. Although such directory access may introduce additional latency, this additional latency may be reduced by maintaining a cache in fast memory of directory entries, as described in commonly-owned, co-pending U.S. patent application Ser. No. 09/256,572, entitled "Directory Cache for Indirectly Addressed Main Memory", to C. Benveniste, P. Franaszek, J. Robinson, C. Schultz, the contents and disclosure of which is incorporated by reference as if fully set forth herein; the second source of additional memory access latency is due to compression and decompression. That is, due to compression, additional time may be required (as compared to conventional systems in which main memory contents are not compressed) for reading data from main memory, since in general each such read requires decompressing a cache line or set of cache lines. Similarly, storing data to main memory may require additional time due to compressing the data. If sets of cache lines are used as the unit of compression, stores to main memory may also involve decompression: in order to store one cache line, it may be necessary to first decompress the remaining cache lines (read from main memory) associated with the line being stored, and only then compress and store the set of lines as a unit. Techniques for speeding up compression and decompression by using parallelism together with shared dictionaries, may be found in commonly-owned U.S. Pat. No. 5,729,228, to P. Franaszek, J. Robinson, J. Thomas entitled PARALLEL COMPRESSION AND DECOMPRESSION USING A COOPERATIVE DICTIONARY and may alleviate this problem. Nevertheless, there may still be a performance degradation due to increased memory access latency as compared to systems that do not use main memory compression.

One approach to solving the problem of increased memory access latency due to compression and decompression is to set aside a partition of main memory in which recently accessed cache lines (or sets of cache lines) are stored in uncompressed form. An example of such an approach, in which the partition is referred to as the "Uncompressed Cache", is described in commonly-owned, U.S. Pat. No. 5,812,817, to Hovis, Haselhorst, Kerchberger, Brown, Luick and entitled COMPRESSION ARCHITECTURE FOR SYSTEM MEMORY APPLICATION.

The approach of partitioning main memory has, however, a potentially serious drawback: each cache line (or set of cache lines) stored in the uncompressed partition is stored twice in main memory: once in compressed form, and a second time in uncompressed form in the partition. Thus, this approach can reduce the overall effectiveness of memory compression due to storing a number of lines twice.

In most current computer operating systems that use virtual memory, the unit of main memory storage allocation, as well as the basis for translating virtual addresses to real addresses, is a page: virtual addresses are translated to real addresses using page tables (also stored in main memory). Using a page as the unit of compression, another approach in which main memory is partitioned into an uncompressed region and a compressed region, but without duplication of pages (i.e., each page is either stored compressed or uncompressed but not both), is described in the reference "Performance Evaluation of Computer Architectures with Main Memory Data Compression", by M. Kjelso, M. Gooch, S. Jones, Journal of Systems Architecture 45 (1999), pages 571–590.

Such an approach has the disadvantage that typical page sizes are relatively large (e.g. 4096 bytes) with respect to compression and decompression times; thus, a design of this type introduces excessively large memory access latencies when there is a cache miss that maps to a page stored in the compressed partition.

It would be thus highly desirable to avoid this problem by providing a computer system implementing compressed main memory that employs a smaller unit of compression, i.e., each page is divided into a number of segments, each of which can be compressed and decompressed independently, in order to reduce excessive memory access latency (as compared to conventional non-compressed memories) that may be incurred due to the delays associated with decompressing a page of main memory whenever it is read from memory, and from compressing a page whenever it is stored to main memory.

It would also be desirable, for a reduced processing time and for more efficient use of memory, not to partition memory, that is, to manage the storage used for all segments, both compressed and uncompressed, in a uniform way.

SUMMARY OF THE INVENTION

It is an object of the present invention to provide a computer system architecture implementing compressed main memory that employs a smaller unit of compression, e.g., a page is divided into a number of segments, each of which may be compressed and decompressed independently, in order to reduce excessive memory access latency. For example, for a typical page size of 4096 bytes, each page may be divided into four (4) segments of 1024 bytes each, effectively reducing memory latency associated with decompression in the case of a cache miss that maps to compressed main memory data by an approximate factor of four (4) as compared to using entire pages as the unit of compression.

It is a further object of the invention to provide a computer system architecture implementing compressed main memory for storing both compressed and uncompressed data segments, each of which may be processed independently and in a uniform manner in order to reduce excessive memory access latency.

It is another object of the invention to provide a computer system architecture as in the previously described objects of the invention that includes a virtual uncompressed cache for storing uncompressed data segments and a virtual uncompressed cache management system for tracking previously accessed uncompressed data segment items from main memory. That is, rather than a partitioning memory scheme where data segments are stored in compressed or uncompressed regions, all data segments are handled uniformly, with the blocks used to store the set of uncompressed segments comprising the virtual uncompressed cache randomly located in memory.

According to the preferred embodiment of the invention, there is provided a system for reducing data access time in a computer system with main memory compression, in which the unit of compression is a memory segment, the system comprising a common memory area for storing uncompressed data and compressed data segments; directory means stored in main memory having entries for locating both uncompressed data segments and compressed data segments for cache miss operations, each directory entry further indicating status of the data segment; control means for accessing said directory entries and checking status indication of a data segment to be accessed for the cache miss event, and enabling processing of the data segment from the common memory area according to the status indication, whereby latency of data retrieval is reduced by provision of uncompressed data segment storage in the common memory area.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

Figure 1:
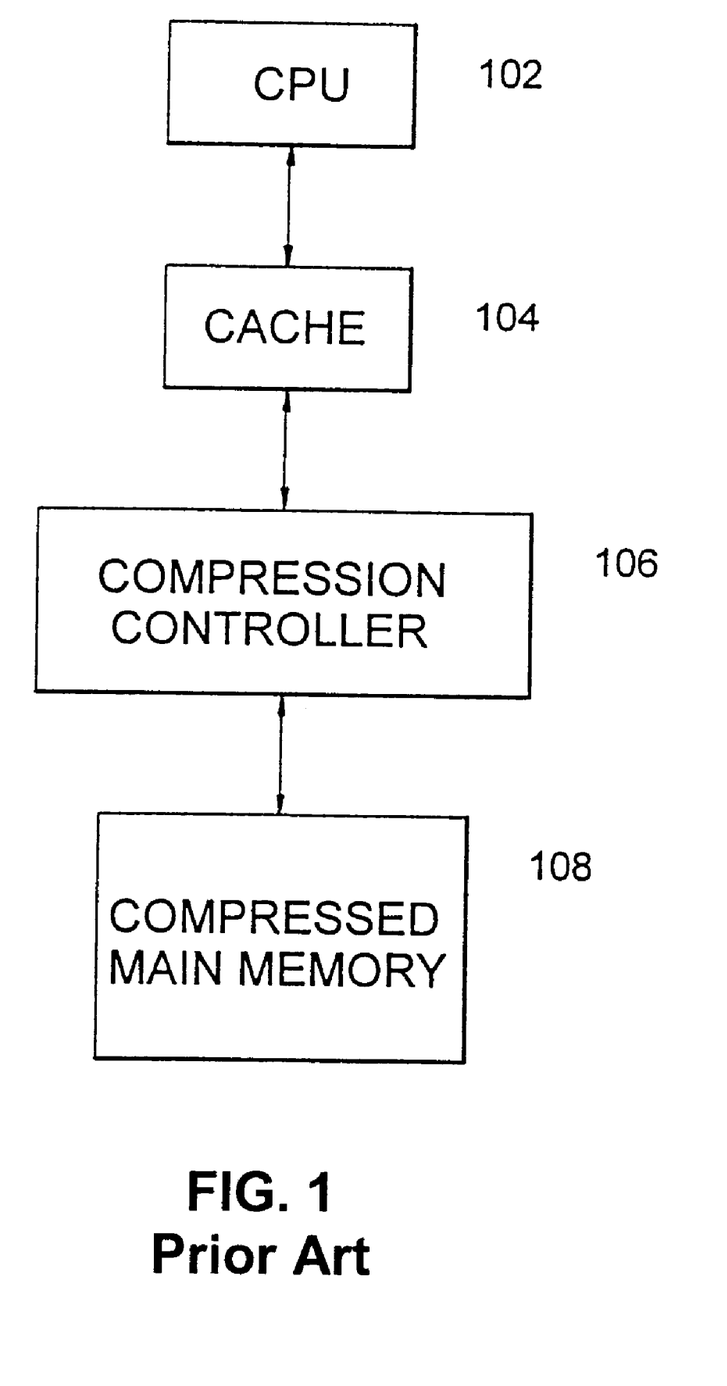
FIG. 1 illustrates the structure of a typical computer system implementing compressed main memory.

FIG. 1 illustrates the overall structure of a typical computer system 100 using compressed main memory. A central processing unit (CPU) 102 reads and writes data from a cache 104. Cache misses and stores result in reads and writes to the compressed main memory 108 by means of a compression controller 106.

Figure 2:
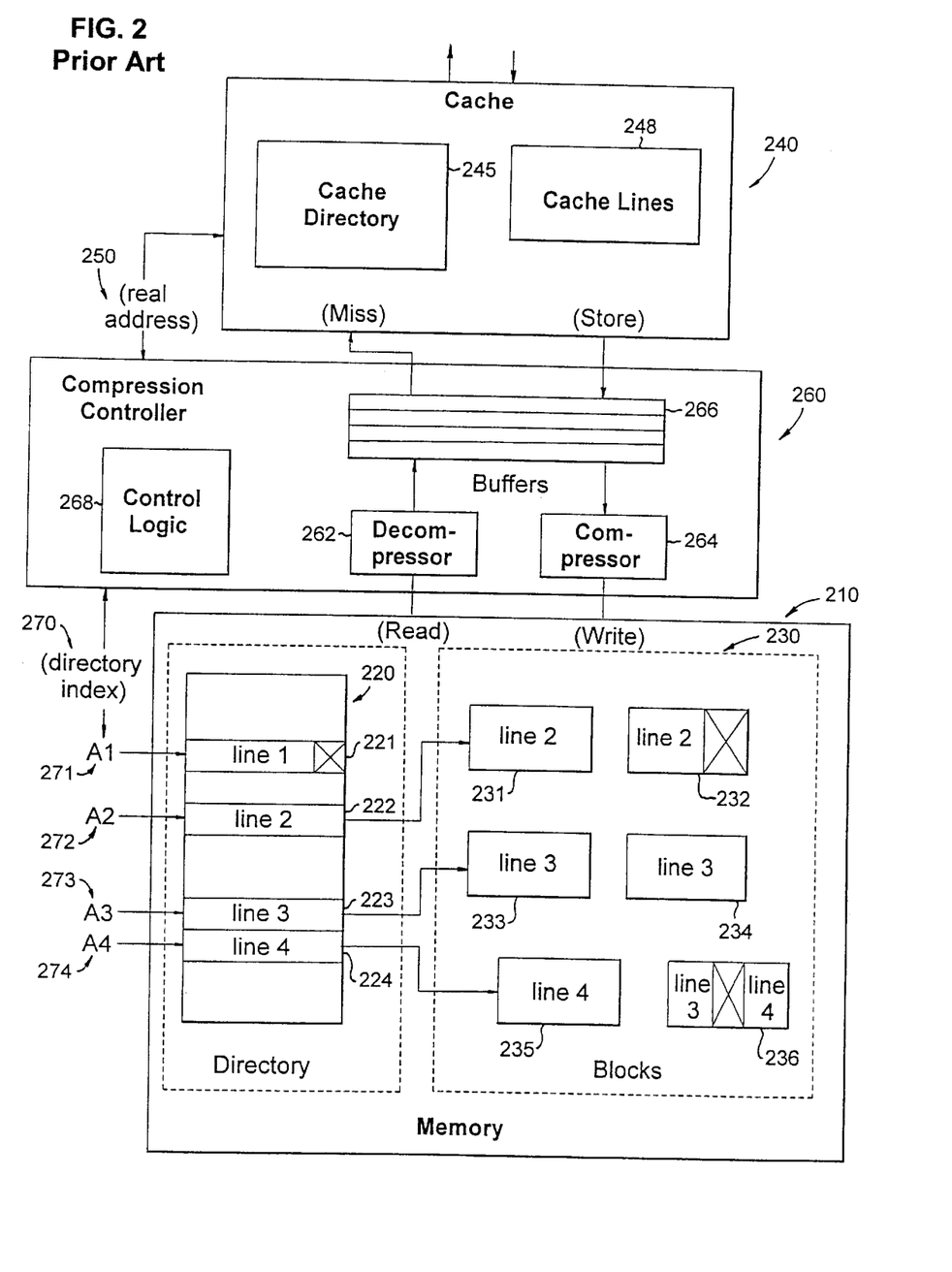
FIG. 2 is a more detailed illustration of a compressed main memory system organization according to the prior art.

FIG. 2 illustrates in more detail the structure of the cache 104, components of the compression controller 106, and compressed main memory 108 of FIG. 1. The compressed main memory 108 is implemented using a conventional RAM memory M 210, which is used to store a directory D 220 and a number of fixed size blocks 230. The cache 240 is implemented conventionally using a cache directory 245 for a set of cache lines 248. The compression controller 260 includes a decompressor 262 used for reading compressed data, a compressor 264 used for compressing and writing data, a number of memory buffers 266 used for temporarily holding uncompressed data, and control logic 268. Each cache line is associated with a given real memory address 250. Unlike a conventional memory, however, the address 250 does not refer to an address in the memory M 210; rather the address 250 is used to determine a directory index 270 into the directory D 220. Each directory entry contains information (shown in more detail in FIG. 3) which allows the associated cache line to be retrieved. The units of compressed data referred to by directory entries in D 220 may correspond to cache lines 248; alternatively the unit of compression may be larger, that is sets of cache lines (segments) may be compressed together. For simplicity, the following examples assume the units of compressed data correspond to cache lines 248: the directory entry 221 for line 1 associated with address A1 271 is for a line which has compressed to a degree in which the compressed line can be stored entirely within the directory entry; the directory entry 222 for line 2 associated with address A2 272 is for a line which is stored in compressed format using a first full block 231 and second partially filled block 232; finally the directory entries 223 and 224 for line 3 and line 4 associated with addresses A3 273 and A4 274 are for lines stored in compressed formats using a number of full blocks (blocks 233 and 234 for line 3 and block 235 for line 4), and in which the remainders of the two compressed lines have been combined in block 236.

Figure 3:
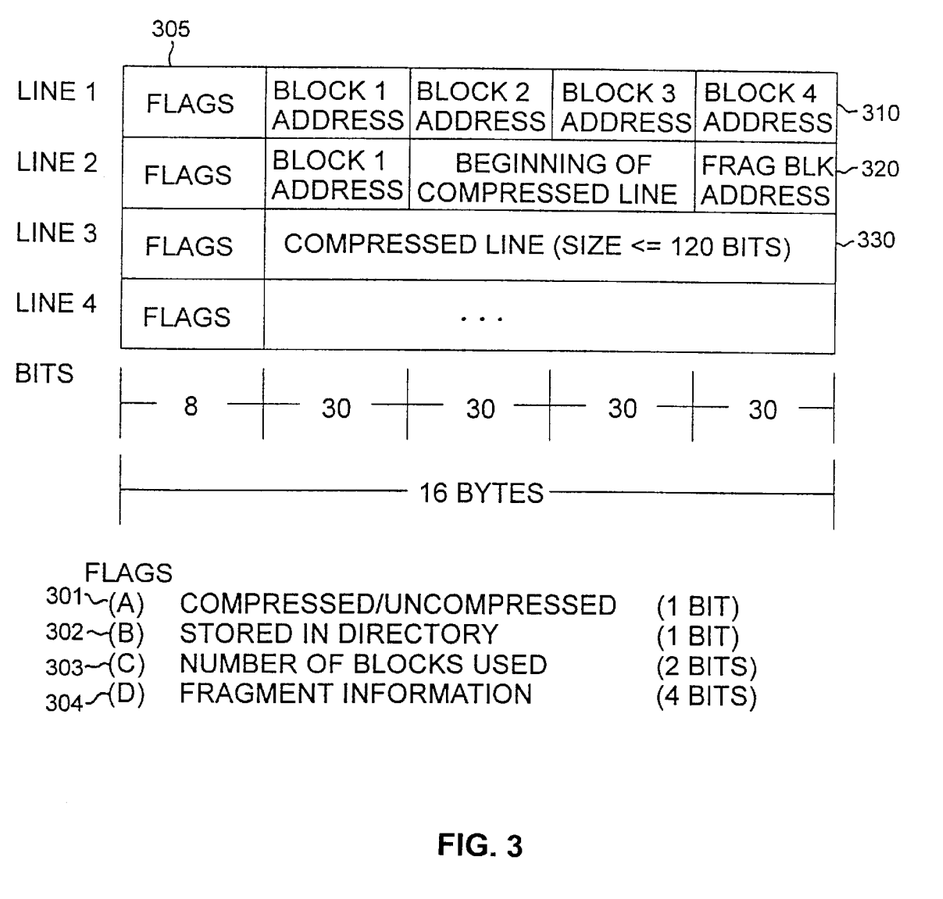
FIG. 3 depicts examples of directory entry formats used in the compressed main memory system of FIG. 2.

FIG. 3 illustrates some possible examples of directory entry formats. For this example it is assumed that the blocks 230 of FIG. 2 are of size 256 bytes and that the cache lines 248 of FIG. 2 are of size 1024 bytes. This means that lines may be stored in an uncompressed format using four blocks. For this example directory entries of size 16 bytes are used, in which the first byte comprises a number of a flags; the contents of the first byte 305 determine the format of the remainder of the directory entry. A flag bit 301 specifies whether the line is stored in compressed or uncompressed format; if stored in uncompressed format, the remainder of the directory entry is interpreted as for line 1 310, in which four 30 bit addresses give the addresses in memory of the four blocks containing the line. If stored in compressed format, a flag bit 302 indicates whether the compressed line is stored entirely within the directory entry; if so, the format of the directory entry is as for line 3 330, in which up to 120 bits of compressed data are stored. Otherwise, for compressed lines longer than 120 bits, the formats shown for line 1 310 or line 2 320 may be used. In the case of the line 1 310 format, additional flag bits 303 specify the number of blocks used to store the compressed line, from one to four 30 bit addresses specify the locations of the blocks, and finally the size of the remainder, or fragment, of the compressed line stored in the last block (in units of 32 bytes) together with a bit indicating whether the fragment is stored at the beginning or end of the block, is given by four fragment information bits 304. Directory entry format 320 illustrates an alternative format in which part of the compressed line is stored in the directory entry (to reduce decompression latency); in this case addresses to only the first and last blocks used to store the remaining part of the compressed line are stored in the directory entry, with intervening blocks (if any) found using a linked list technique, that is each block used to store the compressed line has, if required, a pointer field containing the address of the next block used to store the given compressed line.

Having described an example of a compressed main memory system and a compressed main memory directory structure, one method of the operation of the invention is now described in greater detail. As described above, the unit of compression may consist of a cache line; or, alternatively, sets of cache lines that may be compressed and decompressed together. For example, given a cache line size of 64 bytes, sets of 16 contiguous cache lines, aligned on 1024 byte real memory address boundaries, may form the unit of compression. To avoid ambiguity, the unit of compression (which may comprise a single cache line or sets of cache lines as just described) is referred to as a segment. Thus, each directory entry in D 220 (FIG. 2) provides the status and location of the blocks used to store a compressed or uncompressed segment.

As previously mentioned, maintaining a number of recently used segments in uncompressed format reduces additional memory latency resulting from compression and decompression. There are a number of software techniques or hardware implementations that may be used for maintaining a list of recently used items. Non-limiting example implementations include FIFO (first-in-first-out) lists, LRU (least-recently-used) stacks, etc. As described in greater detail herein, a FIFO list hardware implementation is provided with the FIFO comprising a list of directory indexes (270 in FIG. 2) of the uncompressed data segments currently residing in the virtual uncompressed cache. That is, each segment referred to by a directory index in the FIFO is stored in uncompressed format, and the collection of all such segments forms the virtual uncompressed cache.

Figure 4:
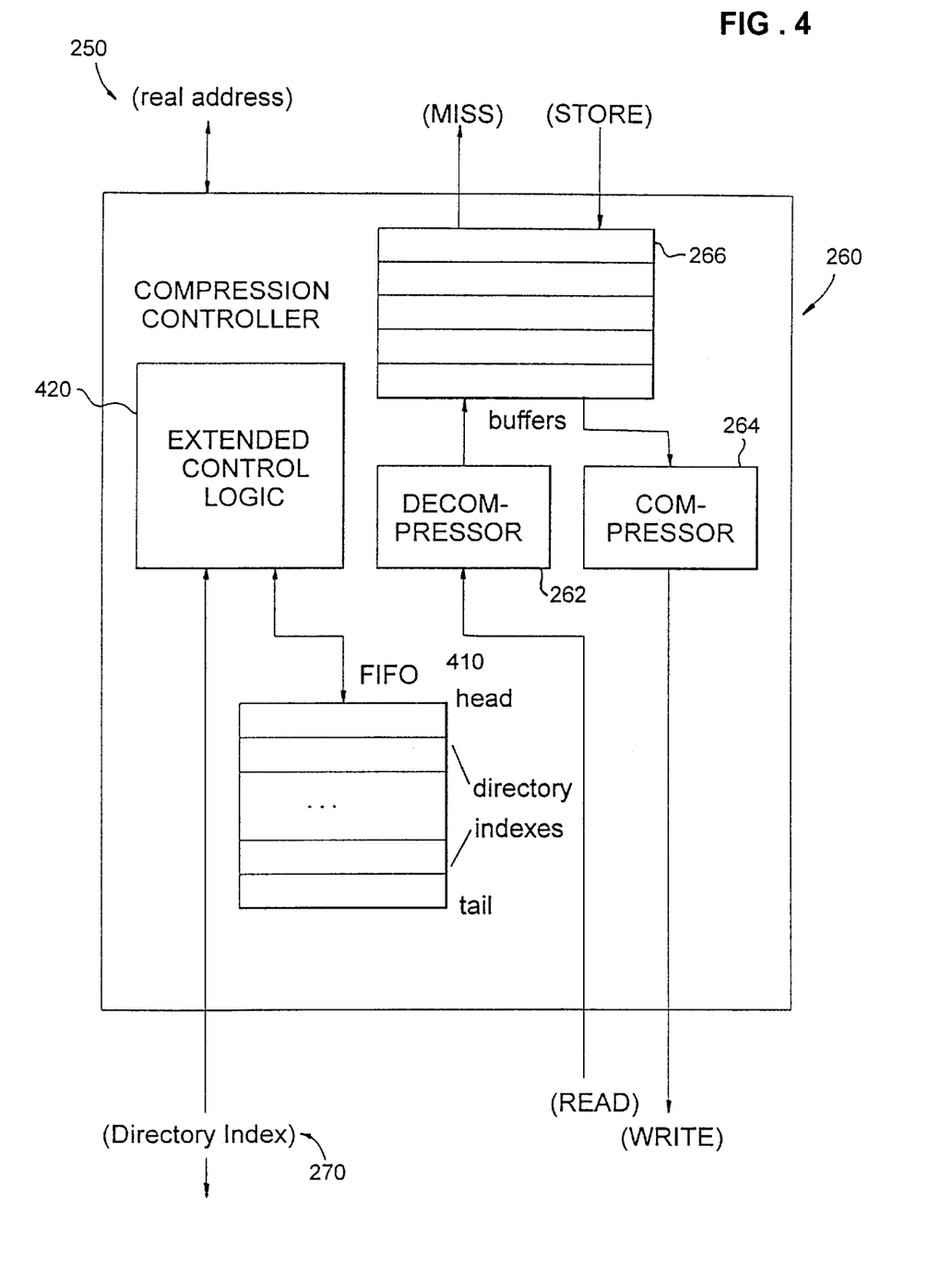
FIG. 4 depicts an example compression controller for providing a FIFO implementation of the virtual uncompressed cache according to the invention.

FIG. 4 illustrates one embodiment of the invention depicting how the compression controller 260 (FIG. 2) is extended to include a FIFO unit 410, together with extended control logic 420 that makes use of the FIFO 410 to manage the virtual uncompressed cache. The FIFO unit may be implemented using shift registers, or alternately, implemented as a memory array with registers pointing to the head and tail of the FIFO, together with a register providing the current number of items in the FIFO (initially the FIFO is empty). As is well-known, operations on a FIFO include: (1) inserting an item (at the head of the FIFO); and, (2) removing an item (at the tail of the FIFO). Once the FIFO becomes full, i.e., when the current number of items is the same as the size of the FIFO, in order to insert a new item the item at the tail must also be removed.

Note that using a FIFO implementation, excluding the head and tail of the FIFO, the contents of the FIFO may only be found by a linear scan. It is desirable, when accessing a segment, to quickly determine if the directory index for the segment is currently stored in the FIFO or not. Since a linear scan of the FIFO may be time consuming, the directory entry formats shown and described with respect to FIG. 3 may be extended so as to indicate the status of a segment with respect to its membership in the virtual uncompressed cache, i.e., whether the directory index is contained in the FIFO. For example directory formats of FIG. 3, this may be done without introducing additional flag bits, since every segment referred to by the FIFO is known to be stored in uncompressed format. In the case that the uncompressed flag 301 (of FIG. 3) is set to uncompressed, the remaining flags are unused for this case, and are therefore available for other uses. For example, flag bit 302 of FIG. 3 could be interpreted, when set and when the segment is marked as uncompressed, to indicate that the directory index is in the FIFO, and interpreted when clear and when the segment is marked as uncompressed, to indicate that the directory index is not in the FIFO. This is subsequently referred to as the "IN-FIFO" flag bit. This is described only as an extended example; similar extensions may be made for other possible directory entry formats.

Figure 5:
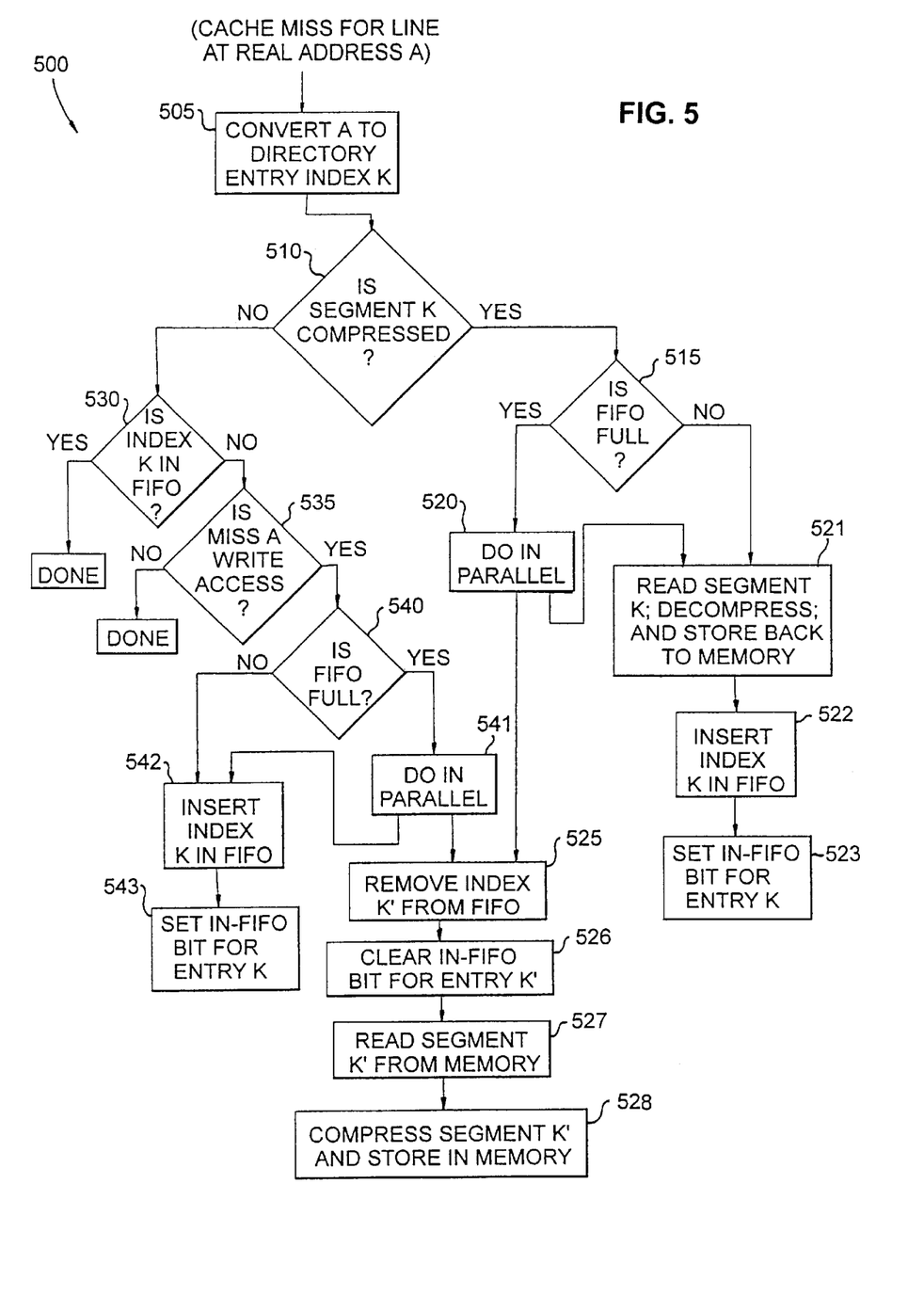
FIG. 5 depicts the steps for controlling FIFO management of the virtual uncompressed cache according to the invention.

FIG. 5 illustrates the control flow 500 for the extended control logic 420 for managing the virtual uncompressed cache. It should be understood that the logic depicted in the method flow 500 of FIG. 5 takes place in response to a cache miss (in the cache 240 of FIG. 2, for example) for some cache line at real memory address A. In a first step 505, the real memory address A is converted to a directory entry index K (hereinafter referred to as "entry K" while the segment referred to by this entry is hereinafter referred to as "segment K"). In addition to the uncompressed segments in the virtual uncompressed cache, certain other segments are also stored in uncompressed format, since for example, it may be found that the data in the segment does not compress. Therefore, in step 510, the flag bit 301 (FIG. 3) in directory entry K is examined to determine if segment K is compressed. If it is determined that the segment is uncompressed, control proceeds to step 530, where a determination is made as to whether the "IN-FIFO" flag bit (e.g., flag bit 302) in entry K indicates that the index is currently stored in the FIFO 410. If, at step 530, the flag bit indicates that the index is currently stored in the FIFO, processing is complete (the segment being accessed is already in the virtual uncompressed cache) and the process terminates for that cache miss event. Otherwise, at step 530, if the flag bit indicates that the index is not currently stored in the FIFO, i.e., the uncompressed segment is not in the virtual uncompressed cache, then the process proceeds to step 535 where a determination is made as to whether the cache miss is a read access. Since there is no performance benefit in adding a segment that does not compress to the virtual uncompressed cache in the case of read operations (which do not change the data), then, in the case of a read access, virtual cache management processing is completed for that cache miss event. However, a write access will change the data in the segment, in which case the line may become compressible. Therefore, in the case of a cache miss write access event, control proceeds to step 540, where a determination is made as to whether the FIFO is full. If the FIFO is not full, the directory index K is inserted in the FIFO at step 542, and the "IN-FIFO" flag bit is set in step 543 for that corresponding directory entry. If, at step 540 it is determined that the FIFO is full, then control proceeds to step 541, which initiates two parallel sequences of operations: a first sequence comprising steps 542 and 543, which, as described, requires inserting the directory index K in the FIFO (step 542) and setting the "IN-FIFO" flag bit (step 543) for that corresponding directory entry; and, a second sequence comprising steps 525, 526, 527, and 528 for removing an item from the FIFO and removing a segment from the virtual uncompressed cache.

Particularly, steps 525 through 528 logically remove a segment from the virtual uncompressed cache as follows: First, at step 525, a directory index K' is found by removing the item at the tail of the FIFO. Next, at step 526, having found and read entry K', the "IN-FIFO" flag bit is cleared for entry K'. Next, in step 527, segment K' is read from the virtual uncompressed cache memory. Last, at step 528, this segment is compressed and stored back to memory. Alternately, in the scenario where the new written data can not be compressed, then, as discussed above, that segment will be left uncompressed but its index not stored in the FIFO.

Returning back to step 510, FIG. 5, if it is determined from directory entry K that segment K is compressed, then control proceeds to step 515 where a determination is made as to whether the FIFO is full. If the FIFO is not full, then segment K can be added to the virtual uncompressed cache without removing another segment from the virtual uncompressed cache. This takes place by performing a sequence comprising steps 521, 522, and 523. First, at step 521, the segment K is read from memory; decompressed; and stored back to memory in an uncompressed format. Next, at step 522, directory index K is inserted at the head of the FIFO. Lastly, at step 523, the "IN-FIFO" flag bit for the entry K is set.

If, at step 515, it is determined that the FIFO is full, then there is performed a combination of steps as previously described herein. Particularly, at step 520, two sequences of steps are initiated to take place in parallel: a first sequence comprising steps 525, 526, 527, and 528, as previously described, which involve logically removing the segment referred to by the tail of the FIFO from the virtual uncompressed cache (step 525); clearing the "IN-FIFO" flag bit for entry K' (step 526); reading the segment K' from the virtual uncompressed cache memory (step 527); and, compressing and storing the segment back to memory (step 528); and, a second sequence comprising steps 521, 522, 523, as described herein, for logically adding segment K to the virtual uncompressed cache, with directory index K at the head of the FIFO. That is, reading the segment K from memory, decompressing the segment, and storing the segment back to memory in an uncompressed format (step 521); inserting the directory index K at the head of the FIFO (step 522); and, setting the "IN-FIFO" flag bit for the entry K (step 523).

As described, maintaining a number of segments in uncompressed format lowers the overall compression, and a relatively small number of such segments suffice to give good hit ratios. That is, additional latency associated with decompression is significantly reduced. Since only a relatively small number of uncompressed segments are maintained (as compared to the total main memory size), the effect on compression is negligible. Maintaining a number of recently used segments in uncompressed format is particularly useful (for increasing memory performance) when the memory cache immediately above the main memory has a line size "S" which is smaller than the segment size "T" (i.e., the unit of compression in main memory). For example, suppose S is 64 bytes and T is 1024 bytes: it is quite common for several or all of the 64 byte lines of a 1024 byte segment to be referenced (reads and/or writes) in a short period of time; since each 64 byte section of an uncompressed 1024 byte main memory segment is addressable in an uncompressed format, no decompression is required for this set of references.

While the invention has been particularly shown and described with respect to illustrative and preferred embodiments thereof, it will be understood by those skilled in the art that the forgoing and other changes in form and detail may be made therein without departing from the spirit and scope of the invention which should be limited only by the scope of the appended claims. For example, mechanisms other than a FIFO list may be used to manage the virtual uncompressed cache. For example, an LRU (least-recently-used) stack data structure may be used in place of a FIFO, and the changes required are straightforward given the above example implementation using a FIFO list.

We claim:

1. A system for reducing data access time in a computer system with main memory compression, in which the unit of compression is a memory segment, the system comprising:

a common memory area for storing uncompressed data and compressed data segments, said common memory area including a virtual uncompressed cache for storing data segments recently accessed by said computer system in uncompressed form at random locations in said common memory;

directory structure stored in main memory having entries for locating both uncompressed data segments and compressed data segments in response to cache miss operations, wherein CPU generated real memory addresses are translated into one or more physical memory locations using said directory structure, each said directory entry including a first bit flag for indicating compressed or uncompressed status of said data segment, and for each uncompressed data segment, said directory entry further including a second bit flag for indicating membership of said uncompressed data segment in said virtual uncompressed cache;

control means for accessing said directory entries and checking status and membership indication of a data segment to be accessed for said cache miss operation, and enabling processing of said data segment from said common memory area according to said status and membership indication, said control means for checking status and membership including means for maintaining a set of directory indexes, each index corresponding to a previously accessed uncompressed data segment currently stored in said virtual uncompressed cache, said control means checking said first and second bit flags to determine membership of an uncompressed data segment in said set of indexes and access status of said uncompressed data segment, whereby latency of data retrieval is reduced by storing said recently accessed data segments once in uncompressed form in said virtual uncompressed cache.

2. The system as claimed in claim 1, wherein said set comprises a predetermined amount of said directory indexes.

3. The system as claimed in claim 2, wherein said means for maintaining said set of indexes comprises a FIFO list.

4. The system as claimed in claim 2, wherein said means for maintaining said set of indexes comprises a least recently used stack.

5. The system as claimed in claim 4, wherein said control means further includes means for determining whether a current amount of indexes in said set of indexes has reached a predetermined limit, whereby when said set of indexes has not reached a predetermined limit and said data segment is determined as an uncompressed data segment for a write access cache miss event, said control means adding a new index corresponding to said uncompressed data segment to be written into uncompressed data storage in said set of indexes, and setting said second bit flag in said directory entry associated with said added index.

6. The system as claimed in claim 5, wherein when said set of indexes has reached a predetermined limit and said data segment is determined as an uncompressed data segment for a write access cache miss event, said control means simultaneously removing an index pointing to a uncompressed data segment from said set of indexes and clearing said second flag bit in said directory entry associated with that removed index, and, replacing said removed index with a new index of said uncompressed data segment to be written into uncompressed data storage in said common memory, and setting said second bit flag in said directory entry associated with said new replaced index.

7. The system as claimed in claim 6, wherein said control means includes means for compressing uncompressed data segments for storage in said common memory area, said control means further reading an uncompressed data segment from common memory pointed to by said removed index and compressing said read uncompressed data segment for storage in said common memory area as a compressed data segment.

8. The system as claimed in claim 7, wherein said control means further includes means for decompressing compressed data segments for storage in said common memory area, whereupon determination that said set of indexes has not reached a predetermined limit and said data segment is determined as a compressed data segment, said control means reading said compressed data and decompressing said read compressed data segment for storage in said common memory area as an uncompressed data segment, and, adding a new index in said set of indexes corresponding to said uncompressed data segment, and setting said second bit flag in said directory entry associated with said added index.

9. The system as claimed in claim 8, whereupon a determination that said set of indexes has reached a predetermined limit and said data segment is determined as a compressed data segment, said control means simultaneously removing an index pointing to an uncompressed data segment from said set of indexes and clearing said second flag bit in said directory entry associated with that removed index, and, reading said compressed data segment and decompressing said read compressed data segment for storage in said common memory area as an uncompressed data segment, adding a new index in said set of indexes corresponding to said uncompressed data segment, and setting said second bit flag in said directory entry associated with said added index.

10. The system as claimed in claim 9, wherein said control means further reading an uncompressed data segment from common memory pointed to by said removed index and compressing said read uncompressed data segment for storage in said common memory area as a compressed data segment.

11. The system as claimed in claim 1, wherein a page of memory comprises one or more memory segments.

12. Method for reducing data access latency for cache miss operations in a computer system implementing main memory compression in which the unit of compression is a memory segment, the method comprising:

providing common memory area in main memory for storing compressed and uncompressed data segments, said common memory area including a virtual uncompressed cache for storing data segments recently accessed by said computer system in uncompressed form at random locations in said common memory;

accessing directory structure formed in said main memory having entries for locating both uncompressed data segments and compressed data segments for cache miss operations, wherein CPU generated real memory addresses are translated into one or more physical memory locations using said directory structure, each said directory entry including index for locating data segments in said main memory, said directory entry including a first bit flag for indicating compressed or uncompressed status of said data segment, and, for uncompressed data segment, said directory entry further including a second bit flag for indicating membership of said uncompressed data segment in said virtual uncompressed cache;

maintaining a set of directory indexes, each index corresponding to a previously accessed uncompressed data segment currently stored in said virtual uncompressed cache;

checking status and membership indication of a data segment to be accessed for a cache miss operation, and processing said data segment from said common memory area according to said status and membership indication, said checking including determining compression state of said segment by said first bit flag and determining membership of an uncompressed data segment in said set of indexes by said second bit flag, whereupon determination of an uncompressed data segment for a cache miss event, the further steps of:

determining whether a current cache miss event requires a write access for said uncompressed data segment; and, upon determination of a write access cache event, determining whether a current amount of indexes in said set of indexes has reached a predetermined limit, wherein when said set of indexes has not reached a predetermined limit for a write access cache miss event, the further steps of adding a new index to said set of indexes, said added index corresponding to said uncompressed data segment to be written into said virtual uncompressed cache in said main memory, and setting said second bit flag in a directory entry associated with said added index.

13. The method as claimed in claim 12, wherein said set comprises a predetermined amount of said indexes.

14. The method as claimed in claim 12, wherein when said set of indexes has reached a predetermined limit and said data segment is determined as an uncompressed data segment for a write access cache miss event, the steps of:

substantially simultaneously removing an index from said set of indexes that points to an uncompressed data segment stored in said virtual uncompressed cache and clearing said second flag bit in said directory entry associated with that removed index; and, replacing said removed index with a new index of said uncompressed data segment to be written into said virtual uncompressed cache and setting said second bit flag in said directory entry associated with said new replaced index.

15. The method as claimed in claim 14, further including the step of reading an uncompressed data segment from said virtual uncompressed cache pointed to by said removed index; and, compressing said read uncompressed data segment for storage in said common memory area as a compressed data segment.

16. The method as claimed in claim 12, whereupon determination of a compressed data segment for a cache miss event, the further steps of:

determining whether a current amount of indexes in said set of indexes has reached a predetermined limit; and, whereby upon determining that said set of indexes has not reached a predetermined limit for a cache miss event, the further steps of:

reading said compressed data and decompressing said read compressed data segment for storage in said virtual uncompressed cache as an uncompressed data segment, and, adding a new index in said set of indexes corresponding to said uncompressed data segment, and setting said second bit flag in said directory entry associated with said added index.

17. The method as claimed in claim 16, whereupon a determination that said set of indexes has reached a predetermined limit, the steps of:

substantially simultaneously removing an index pointing to an uncompressed data segment from said set of indexes and clearing said second flag bit in said directory entry associated with that removed index; and, reading said compressed data segment and decompressing said read compressed data segment for storage in said common memory area as an uncompressed data segment, adding a new index in said set of indexes corresponding to said uncompressed data segment, and setting said second bit flag in said directory entry associated with said added index.

18. The method as claimed in claim 17, further including the steps of: reading an uncompressed data segment from common memory pointed to by said removed index and compressing said read uncompressed data segment for storage in said common memory area as a compressed data segment.

19. The method as claimed in claim 12, wherein said set of directory indexes is a FIFO structure for maintaining a list of directory indexes corresponding to recently accessed uncompressed data segments in said virtual uncompressed cache in main memory.

* * * * *

UNITED STATES PATENT AND TRADEMARK OFFICE
CERTIFICATE OF CORRECTION

PATENT NO. : 6,349,372 B1
DATED : February 19, 2002
INVENTOR(S) : C. Bienveniste et al.

It is certified that error appears in the above-identified patent and that said Letters Patent is hereby corrected as shown below:

<u>Title page,</u>
Item [56], References Cited, U.S. PATENT DOCUMENTS, insert
--      5,729,228    3/1998     Peter A. Franaszek, et al.
       5,761,536    6/1998     Peter Anthony Franaszek
       5,812,817    9/1998     William P. Hovis, et al.
       5,864,859    1/1999     Peter Anthony Franaszek --

Signed and Sealed this

Eighth Day of October, 2002

*Attest:*

JAMES E. ROGAN
*Attesting Officer*     *Director of the United States Patent and Trademark Office*